United States Patent [19]

Savage

[11] 4,222,726

[45] Sep. 16, 1980

[54] BRICK PRESS INCLUDING A REMOVABLE PLUNGER ASSEMBLY AND METHOD FOR REMOVING THE PLUNGER ASSEMBLY

[75] Inventor: William T. Savage, Lemont, Ill.

[73] Assignee: Wehr Corporation, Milwaukee, Wis.

[21] Appl. No.: 965,783

[22] Filed: Dec. 4, 1978

[51] Int. Cl.[3] .......................... B29C 1/16; B28B 7/00; B28B 17/00

[52] U.S. Cl. .................................... 425/195; 425/193; 425/253; 425/344; 425/352; 425/452

[58] Field of Search ....... 425/344, 352, 354, DIG. 35, 425/195, 253, 254, 255, 182, 193; 29/426

[56] References Cited

U.S. PATENT DOCUMENTS

| | | | |
|---|---|---|---|
| 767,872 | 8/1904 | Davies | 425/344 X |
| 2,994,106 | 8/1961 | Posey | 425/195 X |
| 3,161,129 | 12/1964 | Taylor | 29/426 X |
| 3,172,182 | 3/1965 | Assmann | 425/193 X |
| 3,447,205 | 6/1969 | Dorsey | 425/195 |
| 4,050,865 | 9/1977 | Drostholm et al. | 425/195 X |

FOREIGN PATENT DOCUMENTS

| | | | |
|---|---|---|---|
| 618966 | 9/1935 | Fed. Rep. of Germany | 29/426 |
| 453276 | 5/1975 | U.S.S.R. | 29/426 |

*Primary Examiner*—Philip Anderson
*Attorney, Agent, or Firm*—Michael, Best & Friedrich

[57] ABSTRACT

A press is provided of the type used in compressing refractory material at high pressures in the manufacture of bricks and the like. The press includes a bed, columns supported by the bed, and a mold table slidably supported on the columns, the mold table including a central aperture housing a removable mold. The press further includes at least one plunger extending upwardly into the mold cavity of the mold. The press also includes a pallet for supporting the plunger, the pallet being releasably attached by alignment pins to the press bed and being supported for slidable movement on the upper surface of the press bed by a plurality of inflatable air bags located between the upper surface of the press bed and the pallet, the air bags each including at least one aperture in the bottom wall of the air bag. Air can be forced into the air bags to cause inflation of the air bags and can escape through the aperture in the bottom wall to form a fluid cushion between the pallet and the upper surface of the press bed.

12 Claims, 4 Drawing Figures

BRICK PRESS INCLUDING A REMOVABLE PLUNGER ASSEMBLY AND METHOD FOR REMOVING THE PLUNGER ASSEMBLY

BACKGROUND OF THE INVENTION

The invention relates to presses of the type used in compressing refractory material in the manufacture of bricks and the like. More particularly, the invention relates to brick presses which include at least one plunger assembly for use in compressing refractory material in a mold, and to a press construction wherein the plunger assembly and the mold are removable. The invention also relates to a method for removing the plunger assembly and the mold from the press.

Brick presses of the type of the invention commonly include a mold table which is vertically slideable on columns. The mold table supports a removable mold having a plurality of vertical mold cavities. The press also includes a plunger assembly having a plurality of rigid plungers extending upwardly into the mold cavities, the ends of the plungers providing forming surfaces. Such presses commonly further include a second plunger assembly supported above the mold and including a plurality of plungers moveable downwardly to compress refractory material in the mold. Presses of this type are frequently used to form a variety of products having different shapes and sizes. Accordingly, it is frequently necessary to replace the mold and the plunger assemblies with alternate molds and plunger assemblies. As described in the U.S. Dorsey Pat. No. 3,447,205, in recent years the trend in the industry has been to use presses developing very high forming pressures, and the presses have required heavy structural components which may be difficult to remove from the press and difficult to handle. Accordingly, removal and replacement of the plunger assemblies has been time consuming and labor intensive.

SUMMARY OF THE INVENTION

The invention provides an improved press of the type for use in the manufacture of bricks and other similar products formed of compressed refractory material, the press including an improved means for removing the press mold and the lower plunger assembly from the press to thereby facilitate substitution of an alternate mold and lower plunger assembly. The invention also includes an improved method for removing the press mold and the lower plunger assembly.

More particularly, the invention includes a press for use in shaping refractory material and including a bed having a planar surface, a frame attached to the bed and including at least a pair of columns, and a mold table supported by the columns for movement toward and away from the bed. A mold box is releasably supported by the mold table, the mold box including at least one mold cavity. The press also includes means for transferring the mold box into and out the of the press, the transferring means including a planar pallet supportable by the planar surface of the bed, at least one plunger supported by the pallet and adapted to be received in the mold cavity for compressing refractory material therein, and means for supporting the pallet on the planar surface of the bed for slidable movement into and out of the press.

One of the features of the invention is that the means for supporting the pallet for slidable movement includes means for forming an air cushion between the pallet and the bed planar surface, the air cushion forming means including a plurality of inflatable air bags secured to the pallet and positioned between the pallet and the upper surface of the bed and means for forcing air between the pallet and the planar surface of the bed.

This invention also includes a method for removing a plunger assembly from a press, the plunger assembly including at least one vertically extending plunger, and the press including a press bed, a frame supported by the press bed and including at least a pair of vertical columns, a mold table supported for slidable movement on the support columns and including a central cavity, and a mold box releasably supported in the central mold table cavity. The method includes the steps of providing a planar pallet having a planar upper surface for supporting the vertically extending plunger and positioning the pallet above the planar upper surface of the press bed, forcing air between the pallet and the press bed for providing an air cushion for the pallet, and sliding the pallet out of the press and off of the press bed while the pallet is supported on the air cushion.

Various other features of the invention are set forth in the following description, in the drawings, and in the claims.

Figure 1:
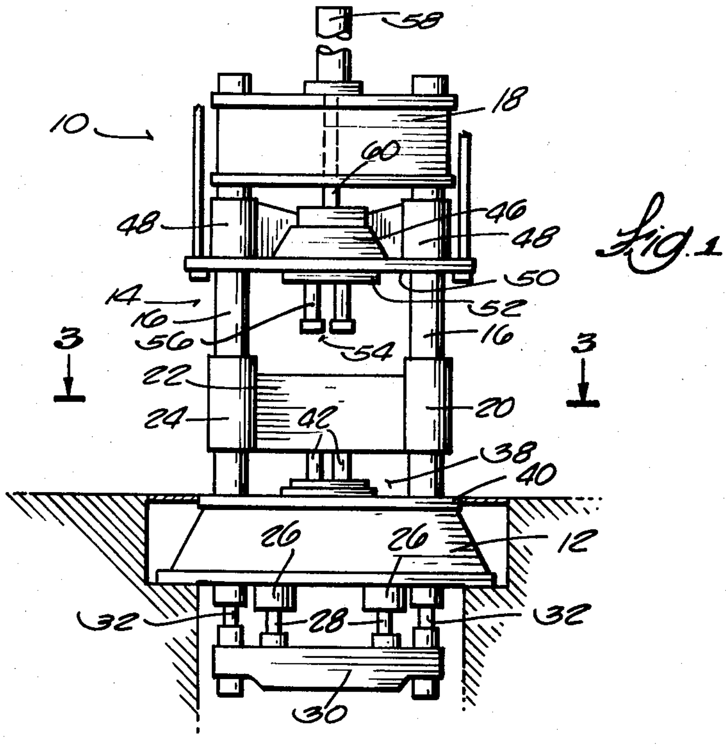
FIG. 1 is an elevation view of a brick press embodying the invention.

Before describing at least one embodiment of the invention in detail, it is to be understood that the invention is not limited in its application to the details of construction and the arrangement of the components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

DESCRIPTION OF THE PREFERRED EMBODIMENT

Illustrated in FIG. 1 is a press 10 for use in compressing refractory material and for forming bricks and other material formed by compressing refractory material under high pressures in a mold. The press 10 generally includes a bed 12 functioning as a rigid supporting structure and a rigid frame assembly 14 supported by the bed 12. The frame assembly 14 is comprised of four spaced parallel cylindrical support columns 16 and an upper frame member or yoke 18 supported in spaced relation from the bed 12 by the support columns 16.

The press 10 further includes a mold table 20 which is positioned above the bed 12 and is slidable on the cylindrical support columns 16 in the direction of their longitudinal axes. The mold table 20 is comprised of a generally rectangular body 22 supported at its corners by sleeves 24 in turn supported for slidable movement on the cylindrical support columns 16.

Means are also provided for causing vertical movement of the mold table 20 toward and away from the bed 12, and including a pair of hydraulic cylinders 26 secured to the bed 12 and housing downwardly extending, vertically movable pistons 28 connected at their lower ends to a yoke 30. Spaced parallel tie rods 32 are fixedly attached at their lower ends to respective opposite ends of the yoke 30. The tie rods 32 extend upwardly through the bed 12 and are connected to the mold table 20. Actuation of cylinders 26, thus causes vertical movement of the yoke 30, such movement being translated through tie rods 32 to the mold table 20.

Figure 2:
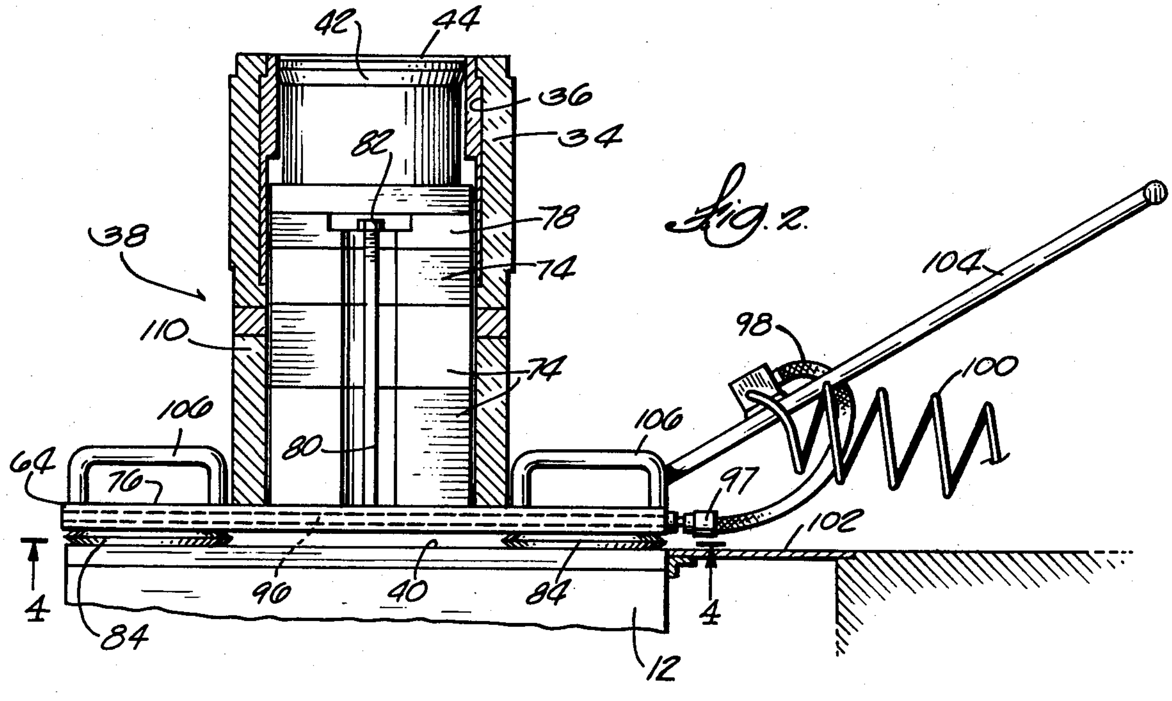
FIG. 2 is an enlarged view of the lower plunger assembly of the brick press shown in FIG. 1, the lower plunger assembly being positioned on a slideably removeable pallet.
Figure 3:
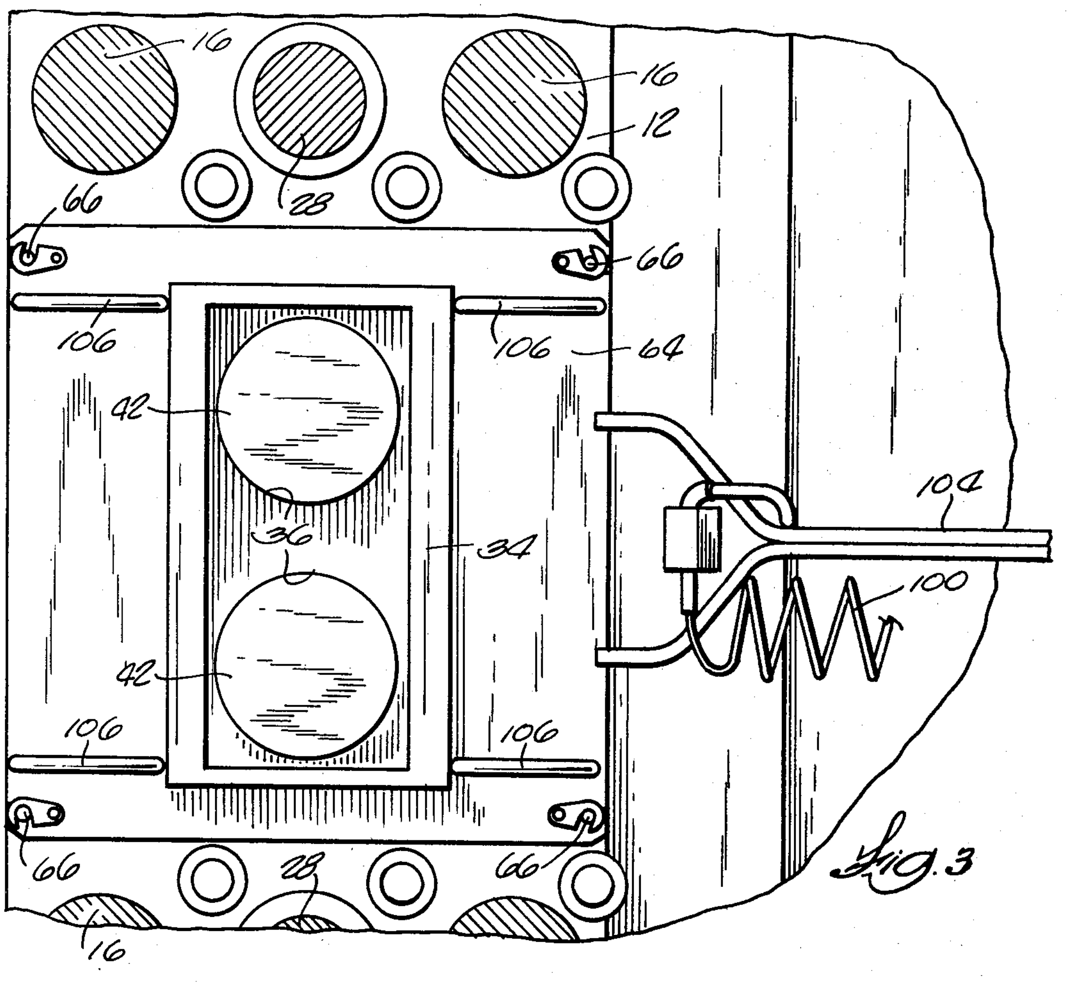
FIG. 3 is an enlarged cross-section view taken along line 3—3 in FIG. 1.

The mold table 20 also includes a central cavity (not shown) intended to have a mold box 34 (FIG. 2) removably secured therein. The mold box 34 can be releaseably housed in the mold table cavity by various means including, for example, a plurality of wedges as illustrated in co-pending U.S. Patent Application Ser. No. 965,794, filed Dec. 4, 1978 and assigned to the assignee of the present invention, that application being Titled "Press for Compressing Refractory Material and Including a Quick Change Mold Box", and being assigned Attorney's Docket Number 4326. In the illustrated construction, the mold box 34 housed within the cavity in the mold table 20, includes a plurality of vertical mold cavities 36, each being open at the top and at the bottom, the mold cavities 36 being intended to receive refractory material therein and being functional to provide forming surfaces whereby that refractory material can be compressed.

The press 10 further includes a plunger assembly 38 supported by the upper surface 40 of the bed 12 and including one or more spaced parallel plungers 42 adapted to extend upwardly into the mold cavities 36 of the mold box 34, the upper planar surfaces 44 of the plungers 42 providing forming surfaces.

The press 10 also includes a crosshead 46 positioned between the mold table 20 and the yoke 18, the crosshead 46 being supported by the columns 16 for slidable movement toward and away from the mold table 20. The crosshead 46 includes a plurality of supporting sleeves 48 supported for slidable longitudinal movement on the support columns 16. The crosshead 46 further includes a planar lower surface 50 supporting a base plate 52 thereon, the base plate 52 being rigidly attached to the crosshead 46.

A removable upper plunger assembly 54 is removably secured to the base plate 52 and includes one or more downwardly extending plungers 56, the plungers 56 extending vertically downwardly and being aligned with the mold cavities 36 of the mold box 34. The plungers 56 are also aligned with the upwardly extending plungers 42 of the lower plunger assembly so as to be adapted to be received in the mold cavities 36 for compressing refractory material therein when the crosshead 46 is moved downwardly.

Means are also provided for forcing the crosshead 46 downwardly so that the plungers 56 are received in the mold cavities 56 in the mold box 34 and to thereby cause compression of the refractory material housed in the mold box. While various arrangements can be provided, in the illustrated construction, the means for forcing the crosshead 46 downwardly includes a hydraulic cylinder 58 supported by the yoke 18 and having a downwardly extending hydraulic piston 60, the piston 60 having a free end applying a downward compressive force on the crosshead 46. It will be appreciated by one skilled in the art that a plurality of alternative means could similarly be employed to apply a downward force on the crosshead. Such alternative means could include a screw mechanism, a conventional toggle clamping mechanism, or a combination of either the screw or the toggle mechanism with a hydraulic clamping device.

In operation of the brick press illustrated in FIG. 1, the hydraulic cylinders 26 controlling the position of the mold table 20 are actuated to lower the mold table 20 such that the plungers 42 of the lower plunger assembly 38 are received in the lower portions of the mold cavities 36 of the mold box 34 to thereby provide a surface for supporting refractory material in the mold box 34. Refractory material is then placed in the mold cavities and the hydraulic cylinder 58 is actuated to force the crosshead 46 downwardly whereby the plungers 56 of the upper plunger assembly 54 are forced into the mold cavities 36 and the refractory material therein is compressed between the plungers 56 of the upper plunger assembly 54 and the plungers 42 of the lower plunger assembly 38. After the refractory material has been compressed, the crosshead 46 is returned to its upper position. The mold table 20 is then moved downwardly by actuation of the cylinders 26 whereby the plungers 42 of the lower plunger assembly 38 push the formed bricks upwardly out of the mold cavities 36 such that they can be removed from the brick press 10.

Means are also provided for supporting the lower plunger assembly 38 and the mold box 34 for convenient removal from the press 10 to facilitate substitution of an alternate mold box 34 and an alternate plunger assembly 38. The supporting means includes a rigid plate or pallet 64 supported on the upper surface 40 of the bed 12 and for supporting the lower plunger assembly 38. The pallet 64 is properly positioned in alignment with the upper surface 40 of the press bed 12 by a plurality of alignment pins 66 which project upwardly from the surface of the bed 12 and are received within slots 68 in the edges of the pallet. In the illustrated construction the alignment pins 66 comprise bolts which are threaded into threaded bores in the upper surface of the press bed 12 and which include ends projecting vertically from the surface of the bed. The projecting portions of the bolts are received within slots 68 in the edges of the pallet 64 such that the pallet is restrained against movement with respect to the press bed.

While various arrangements can be provided in the illustrated construction, the lower plunger assembly 38 includes a plurality of shims 74, positioned in stacked relation on the upper surface 76 of the pallet 64. The plunger or plungers 42 of the lower plunger assembly 38 are each rigidly attached to a plunger supporting plate 78 and the plunger supporting plate 78 is in turn supported by the shims 74. Means are also provided for clamping the plunger supporting plate 78 and the shims 74 against the upper surface 76 of the pallet 64. The clamping means includes a plurality of tie rods 80 each having a lower end secured to the pallet and a threaded upper end extending upwardly through a notch in the periphery of the plunger supporting plate 78. A nut 82 is threaded onto the threaded end of each of the tie rods 80 and engages the upper surface of the plunger supporting plate 78 whereby the shims 74 and the plunger supporting plate 78 may be clamped against the pallet.

Figure 4:
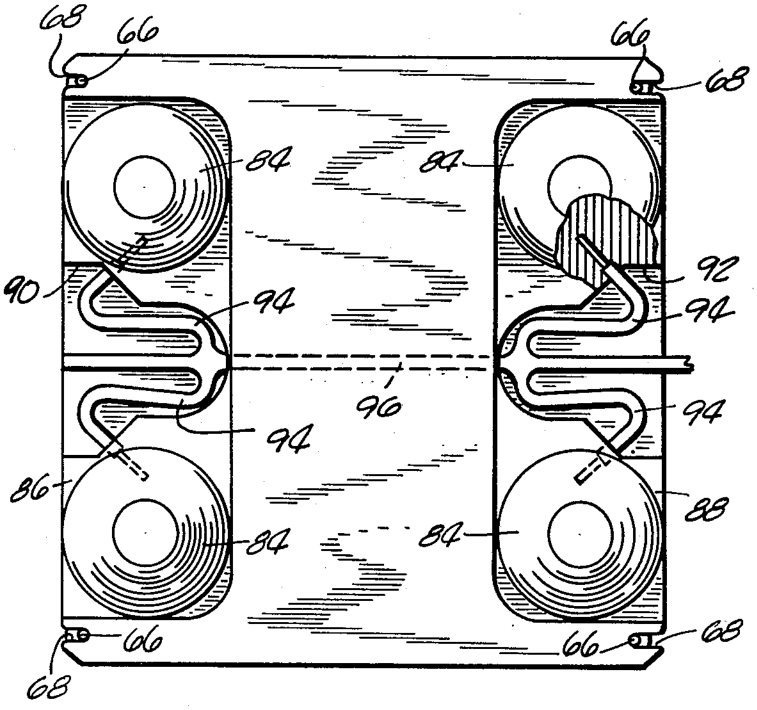
FIG. 4 is view taken generally along line 4—4 in FIG. 2 and with portions broken away.

Means are also provided for facilitating slidable movement of the pallet 64 out of the press 10. Such means includes a plurality of circular air bags 84 attached to the bottom surface of the pallet 64 and positioned beneath the corners of the pallet. The air bags 84 are secured to the lower surface of the pallet and are joined in fluid communication with air conduits extending through the pallets. As shown in FIG. 4, the opposite edges 86 and 88 of the pallet include recesses 90 and 92 respectively, each housing conduits 94. The conduits 94 in each of the recesses 90 and 92 are connected to a central conduit 96 which extends through the pallet and provides communication of compressed air with the air bags 84. The central conduit 96 includes an end connectable by a coupling 97 to air pressure hose 98 and 100.

The air bags 84 are provided with an aperture (not shown) in their bottom wall whereby the compressed air forced into the air bags 84 through the conduits exits through the aperture and forms an air cushion between the air bag and the upper surface 40 of the press bed 12. As shown in FIG. 1 the press 10 is mounted such that the upper planar surface 40 of bed 12 is coplanar with the surrounding floor, and a plate 102 is provided between the bed 12 and the floor. A handle 104 is attached to the pallet 64 to permit the pallet to be pulled out of the press 10.

Means are also provided to permit the lift forks of a lift truck (not shown) to engage the pallet 64 for transportation once it has been removed from the press 10. More particularly, four inverted U-shaped loops 106 are rigidly attached to the upper surface of the pallet 64 and form two parallel ways on opposite sides of the plunger assembly 38 for receiving the tines of a fork lift truck.

Means are further provided for supporting the removable mold box 34 on the pallet 64 and for thereby facilitating removal of the mold box 34 with the lower plunger assembly and the pallet. In the illustrated construction, the mold box supporting means includes a hollow box or column 110 open at its upper and lower ends and being positionable over the plungers 42 and shims 74 of the plunger assembly 38 in such a manner than the hollow column surrounds the plunger assembly 38, and the lower surface of the column 110 rests upon the upper surface 76 of the pallet.

In operation of the press 10, when it becomes necessary to remove the mold box 34 and the lower plunger assembly 38 in order to substitute a new mold box and plunger assembly and to thereby facilitate manufacture of bricks having an alternative configuration or size, removal of the mold box 34 and the lower plunger assembly 38 is accomplished by first lowering the mold table sufficiently to permit the mold box to rest on the upper surface of the support column. The means for releaseably securing the mold box 34 in the central cavity of the mold table 20 are then caused to release the mold box from the mold table such that the mold box 34 is supported only by the support column 110. The hydraulic cylinders 26 supporting the mold table 20 are then actuated to cause the mold table to move upwardly away from the mold box sufficiently that the lower surface of the mold table 20 is positioned above the upper surface of the mold box 34. The alignment pins 66 restraining the pallet on the press bed are then removed. Compressed air is forced into the inflatable air bags 84 to thereby elevate the pallet 64 and to form an air cushion between the upper planar surface 40 of the bed 12 and the lower surface of the pallet 64. This air cushion is formed by the air supplied to the air bags 84 exiting through the apertures in the bottom walls of the air bags and thereby forming an air bearing between the lower surfaces of the air bags and the upper planar surface of the press bed. The pallet 64 can then be pulled out of the press to a position wherein the lift forks of a fork lift truck can engage the lifting loops 106 for transfer of the pallet 64, the plunger assembly 38, and the mold box 34 to a convenient storage position. A new pallet, supporting a plunger assembly and a mold box can be inserted into the press 10 by reversing the process described above.

Various of the features of the invention are set forth in the following claims.

What is claimed is:

1. A press for use in shaping refractory material and including a bed having a planar surface, a frame attached to the bed and including at least a pair of columns, a mold table supported by the columns for movement toward and away from the bed, a mold box releasably supported by the mold table, the mold box including at least one mold cavity, and means for selectively transferring the mold box into and out of the press and for providing for substitution of an alternative mold box, the transferring means including a planar pallet supportable by said planar surface of said bed, said mold box being supported by said pallet when said mold box is released from said mold table, at least one plunger supported by said pallet and adapted to be received in said mold cavity, and means for selectively supporting said pallet on said planar surface of said bed for slidable movement into and out of said press, said supporting means including means for selectively forming an air cushion between said pallet and said bed planar surface.

2. A press as set forth in claim 1 wherein said air cushion forming means includes a plurality of inflatable air bags secured to said pallet and positioned between said pallet and said upper surface of said bed, and means for selectively inflating said air bags and for forcing air between said pallet and said planar surface of said bed.

3. A press as set forth in claim 2 wherein said means for forming an air cushion includes conduits in said pallet and connected to said air bags for providing airflow to said air bags.

4. A press as set forth in claim 1 and further including a support structure surrounding said plunger and supported by said pallet, said support structure having an upper surface for supporting said mold box.

5. A press as set forth in claim 1 and further including at least a pair of lifting loops attached to said pallet and positioned on opposite sides of said plunger, said lifting loops adapted to receive means for lifting said pallet.

6. A press as set forth in claim 1 and further including means for pulling said pallet out of said press in the direction of the plane of said upper surface of said bed, said pulling means including a handle connectable to said pallet.

7. A press as set forth in claim 1 wherein said pallet is a rigid rectangular plate having a plurality of corners and wherein said means for supporting said pallet for slidable movement includes means for providing an air cushion between said pallet and said bed planar surface, said air cushion means including a plurality of air bags positioned beneath said corners, said air bags being adapted to be inflatable and means for forcing air between said pallet and said planar surface of said bed.

8. A press for shaping refractory material and comprising:

a bed having a planar upper surface, a frame supported by said bed, and including at least a pair of columns, a mold table slidably supported on said columns for movement toward and away from said bed, a mold box supported by said mold table for movement with said mold table, said mold box including at least one mold cavity, means for releasably attaching said mold box to said mold table, a plunger assembly including at least one plunger adapted to be received in said mold cavity, and means for supporting said mold box and said plunger assembly for slidable movement from said press in a direction coplanar with said planar upper surface of said bed, said supporting means including a planar rigid pallet supporting said plunger assembly and said mold box when said mold box is released from said mold table, and means for selectively forcing air at superatmospheric pressure between said pallet and said planar upper surface of said bed for providing an air cushion between said pallet and said planar upper surface of said bed and for supporting said pallet for slidable movement on said planar upper surface.

9. A press as set forth in claim 8 wherein said means for selectively providing an air cushion includes a plurality of inflatable air bags located between said upper surface of said bed and said pallet and means for selectively providing compressed air to said air bags including conduits in said pallet connected to said air bags.

10. A press as set forth in claim 8 and further including means for aligning said pallet and said plunger assembly with said bed and with said mold box, said aligning means including at least a pair of alignment pins extending into said bed and into said pallet.

11. A method for removing a first plunger assembly from a press to permit substitution of a second plunger assembly, the first plunger assembly including at least one vertically extending plunger, and the press including a press bed, a frame supported by the press bed, the frame including at least a pair of vertical columns, and a mold table supported for slidable movement on the support columns and including a central cavity and a mold box releasably supported in the mold cavity, the method comprising the steps of:

providing a pallet having a surface for supporting said vertically extending plunger, said pallet being positioned on said upper surface of said press bed, forcing air between said pallet and said press bed for providing an air cushion for said pallet, and sliding said pallet out of said press and off of said press bed while said pallet is supported on said air cushion.

12. A method for removing a first plunger assembly from a press to permit substitution of a second plunger assembly the first plunger assembly including at least one vertically extending plunger, and the press including a press bed, a frame supported by the press bed, the frame including at least a pair of vertical columns, a mold table supported for slidable movement on the vertical columns and including a central cavity, and a mold box releasably supported in the mold cavity, the method comprising the steps of:

providing a pallet supporting said vertically extending plunger, said pallet being positioned on said upper surface of said press bed, providing at least one air bag between said pallet and said press bed, moving said mold table downwardly whereby said plungers are received in said mold cavity and wherein said mold box engages an upper surface of a support columns, said support column positioned on said pallet, releasing said mold box from said mold table whereby said mold table and mold box are separable, restraining said mold box against movement, moving said mold table upwardly and away from said mold box leaving said mold box supported on said column, forcing air into said air bag to lift said pallet away from said upper surface of said press bed, and sliding said pallet out of said press and off of said upper surface of said press bed while said pallet is supported on said air bag.

* * * * *